United States Patent [19]
Dunne

[11] Patent Number: 6,144,308
[45] Date of Patent: Nov. 7, 2000

[54] TILT COMPENSATION APPARATUS AND METHOD FOR USE WITH A MONOPOD MOUNTED LASER RANGE FINDER APPARATUS

[75] Inventor: Jeremy G. Dunne, Littleton, Colo.

[73] Assignee: Laser Technology, Inc., Englewood, Colo.

[21] Appl. No.: 09/072,286

[22] Filed: May 4, 1998

[51] Int. Cl.[7] .................................................. G08B 21/00
[52] U.S. Cl. .............................................. 340/689; 340/429
[58] Field of Search ................................. 340/689, 686.2, 340/440, 429, 690; 200/61.52, 61.45 R, 61.47, 52 A

[56] References Cited

U.S. PATENT DOCUMENTS

| | | | |
|---|---|---|---|
| 2,754,497 | 7/1956 | Wolpert | 340/689 |
| 3,218,624 | 11/1965 | Zane | 340/689 |
| 4,359,717 | 11/1982 | Huber et al. | 340/429 |
| 4,811,491 | 3/1989 | Phillips et al. | 340/689 |
| 5,657,003 | 8/1997 | Fuentes | 340/689 |

OTHER PUBLICATIONS

Advertisement Brochure "Electrolytic Tilt Sensors" by The Fredericks Company.

Primary Examiner—Jeffery A. Hofsass
Assistant Examiner—John Tweel, Jr.
Attorney, Agent, or Firm—John R. Wahl; William J. Kubida; Hogan & Hartson LLP

[57] ABSTRACT

A tilt compensation method, circuit and apparatus utilizes a two axis tilt sensor or two single axis tilt sensors for alerting, a user and/or compensating a surveying instrument for off vertical alignment above a reference point when the instrument support is free to move about the reference point, e.g., when mounted on a monopod support. The sensor comprises a cell having a central electrode and four peripheral electrodes spaced 90 degrees apart around the central electrode. Fluid in the cell chamber changes the conductance of the electrodes with reference to the central electrode. The cell is mounted to the support or to the instrument itself. A microprocessor preferably provides a square wave drive signal selectively to alternate pairs of the opposing electrodes through tristate buffers while at the same time the microprocessor provides a channel select signal to the gate of the tristate buffers to float the idle electrodes. The signal on the central electrode is fed to an ADC and then to the microprocessor. The microprocessor preferably produces an alarm signal if the tilt is more than a user determined value. The microprocessor may use the sensed tilt magnitude and direction to automatically calculate corrections and compensate the distance measurement made by the distance measuring device such as a laser range finder for the off vertical orientation of the range finder.

26 Claims, 6 Drawing Sheets

TILT COMPENSATION APPARATUS AND METHOD FOR USE WITH A MONOPOD MOUNTED LASER RANGE FINDER APPARATUS

BACKGROUND OF THE INVENTION

1. Field of the Invention

The present invention relates, in general, to the field of surveying instruments. More particularly, the present invention relates to an apparatus and method for compensating a laser based surveying instrument for nonvertical mounting structure alignment.

2. Description of the Related Art

Conventional surveying instruments such as Laser Technology, Incorporated's laser based Criterion series surveying instruments are designed for mounting on a stable tripod which is leveled and held stationary directly over the location from which measurements are to be based. Setting up a surveying instrument in this manner, precisely leveled, especially in rugged terrain is a very time consuming process.

First, a suitable site must be found upon which a tripod can be leveled over the precise point on the ground from which measurements are to be taken. Second, the tripod must be set up with the instrument mounting plate at the apex of the tripod level. Third, the level tripod must be oriented with the aid of a plumb bob such that the center of the mounting plate is exactly over the ground point being measured from. Fourth, the instrument mounted on the mounting plate is then aimed at the target. Next, the level and plumb of the instrument base is again checked. Finally, the measurement is taken and the level and plumb of the instrument base is rechecked again. After each rotational or inclinational movement of the instrument the level and plumb of the instrument is also rechecked to ensure that the support structure has not changed. If it has, the instrument base must be re-leveled and re-plumbed.

All of these manipulations require substantial time to perform. What is needed, then, is a mechanism which enables simply setting up the measuring instrument so as to eliminate some or all of the time consuming setup steps just described without sacrificing accuracy of the resulting measurements. Further, an automatic compensation circuit to compensate the measurement automatically for inaccuracies in physical instrument mounting configurations would be highly desirable.

SUMMARY OF THE INVENTION

It is an object of the present invention to provide a method of warning an operator of a surveying instrument mounted on a monopod support when the support is deviating from an acceptable off vertical alignment so that the operator can maintain the instrument within acceptable limits.

It is another object of the present invention to provide a warning circuit device for surveying instruments mounted on a support such as a monopod to provide a warning to the operator when the support is out of vertical alignment by a predetermined amount so as to eliminate the need for a leveled support.

It is another object of the invention to provide a warning device for surveying instruments mounted on a support fixed in only one dimension to provide a relative quantitative indication to the operator when the instrument support is out of vertical alignment by a predetermined amount and conversely when the instrument is within acceptable limits of vertical alignment.

It is another object of the present invention to provide an automatic compensation circuit for incorporation into conventional laser based surveying instruments to compensate for off-vertical mounting configurations of the laser based surveying instruments.

It is another object of the present invention to provide a modular laser based distance measuring apparatus which includes a circuit for automatic compensation and correction for of vertical alignment of the instrument.

It is a still further object of the invention to provide an automatic tilt compensation circuit in a compass module of a modular laser based distance measuring instrument.

A typical laser based distance measuring instrument utilizes a fluxgate compass for bearing determinations. Alternatively, an angle encoder may be coupled with precise initial positioning of the base of the instrument for bearing determinations. In the case of an instrument using a fluxgate compass, the compass must be maintained at least within about 15 degrees of vertical at all times in order for the compass to provide accurate readings because of a floating ring core in the compass sensor.

In addition, distance measuring instruments typically include an single axis tilt sensor as an inclinometer for measuring the angle between the sighting line to the target and the horizontal plane through the instrument. When the instrument is rotated about the sight line such that the instrument is no longer vertically aligned, a geometric error is introduced to the vertical angle measurement because of this deviation.

The present invention is designed in its simplest form to alert the operator to unacceptable deviation angles from the vertical orientation of the instrument. In more complex forms, the present invention not only alerts the operator to unacceptable deviation angles from the vertical orientation of the instrument but also provides automatic correction of measurements made by the instrument for such deviations.

Basically, the method in accordance with the present invention of alerting an instrument operator to approaching unacceptable off vertical alignment conditions when the instrument is mounted on a monopod or other one dimensional support comprises the steps of:

a) providing a surveying instrument mounted on a one dimensional support;

b) providing a tilt sensor on the support capable of sensing a degree of tilt of the support from a vertical orientation of the support;

c) sensing the degree of tilt; and d) communicating the degree of tilt to the operator.

The communicating step in the method above preferably also includes actuating an audible alarm when the degree of tilt exceeds a predetermined threshold value and may further include the step of varying the amplitude or frequency of the audible alarm as the degree of tilt passes beyond the threshold. Finally, the method may also include the step of automatically correcting measurements made by the surveying instrument.

A first embodiment of the apparatus in accordance with the present invention is a simple apparatus ensuring that distance and inclination measurements made with electronic surveying instruments, such as laser based instruments, are made without the conventional necessity for implementing very time consuming instrument support setup procedures. This first embodiment of the present invention is a self contained apparatus adapted to be fastened to any conventional instrument support such as a monopod or tripod. This apparatus is a battery powered two axis tilt measuring device fastened to the instrument support which provides an audible warning to the operator if the support is moved beyond a predetermined inclination angle in any direction from vertical.

The tilt compensation apparatus of this first embodiment in accordance with the invention basically preferably comprises a two axis tilt sensor, a power supply, and an alarm circuit. Alternatively, two single axis tilt sensors may be used to sense tilt along two orthogonal axes. The alarm circuit may be analog or digital and drives the sensor or sensors, compares the sensor output to a predetermined tilt threshold, and provides preferably an audible alarm when the threshold is exceeded. An exemplary digital alarm circuit may include a microprocessor, an analog to digital converter, an oscillator/amplifier, and a speaker. These circuit components, the sensor and the power supply are all housed compactly in a box shaped housing which can be removably fastened to a support such as a monopod shaft.

The two axis tilt sensor has first and second opposing pairs of parallel peripherally spaced electrodes spaced symmetrically about a central output electrode. In the preferred arrangement of the first embodiment, a microprocessor drives the tilt sensor peripheral electrodes and receives, through an analog to digital converter connected to the pairs of spaced peripheral electrodes, the output of the tilt sensor.

The microprocessor coordinates not only the switching and driving of the electrodes, it also floats the idle pair of electrodes while the other pair is driven, instructs the analog to digital converter when to sample a first output from the output electrode when the drive signal is fed to the first pair of electrodes to determine one coordinate value of the tilt vector and instructs the analog to digital converter to sample a second output from the output electrode when the drive signal is fed to the second pair of peripheral electrodes to determine an orthogonal coordinate value of the tilt vector. The microprocessor then computes the sensed tilt magnitude. The microprocessor also provides an output to an audio oscillator/amplifier and speaker in this first embodiment to provide an audible indication to the operator of the relative angle of the instrument with respect to a vertical orientation. Preferably either or both of the pitch or amplitude of the audible indication may be varied with the intensity of the tilt magnitude away from a vertical orientation.

A second embodiment of the present invention incorporates the tilt sensor and audible alarm functions of the first embodiment into a compass module of a modular laser range finding instrument so that a separate housing is not required. In this preferred embodiment, duplication of components is minimized. The tilt sensor power supply is provided by the instrument power supply and the fluxgate compass module microprocessor is utilized to generate the tilt sensor drive signal and process the tilt sensor output signals in order to interpret the tilt angle and provide the alarm drive signal to the oscillator/amplifier and speaker. This embodiment is very efficiently arranged, eliminating the need for a separate tilt module housing.

A modular laser based distance measurement apparatus in accordance with this invention may also utilize the microprocessor to automatically compensate for non-vertical orientation of the monopod so that the operator preferably need only keep the monopod base securely on the reference point and the monopod shaft generally upright and within about 15 to 25 degrees of vertical alignment. This ensures accurate bearing measurements with the fluxgate compass and accurate distance and vertical angle measurements from the vertical reference point. The microprocessor in this case is configured and programmed to utilize the digitized tilt angle component values to automatically compensate measured bearing and range values during the off vertical condition of the instrument at the time of measurement as well as compensate single axis inclination measurements for errors introduced into the single axis tilt sensor when the ranging module of the instrument is not vertically aligned.

Another embodiment of the invention is utilized in an instrument configuration which has an angle encoder instead of a fluxgate compass. In this embodiment, the tilt compensation mathematics that must be used takes a different form than the corrections utilized in the compass module previously described.

Other objects, features and advantages of the present invention will become apparent from a reading of the following detailed description when taken in conjunction with the accompanying drawing wherein particular embodiments of the invention are disclosed as illustrative examples.

DETAILED DESCRIPTION OF THE INVENTION

First Embodiment

Figure 1:
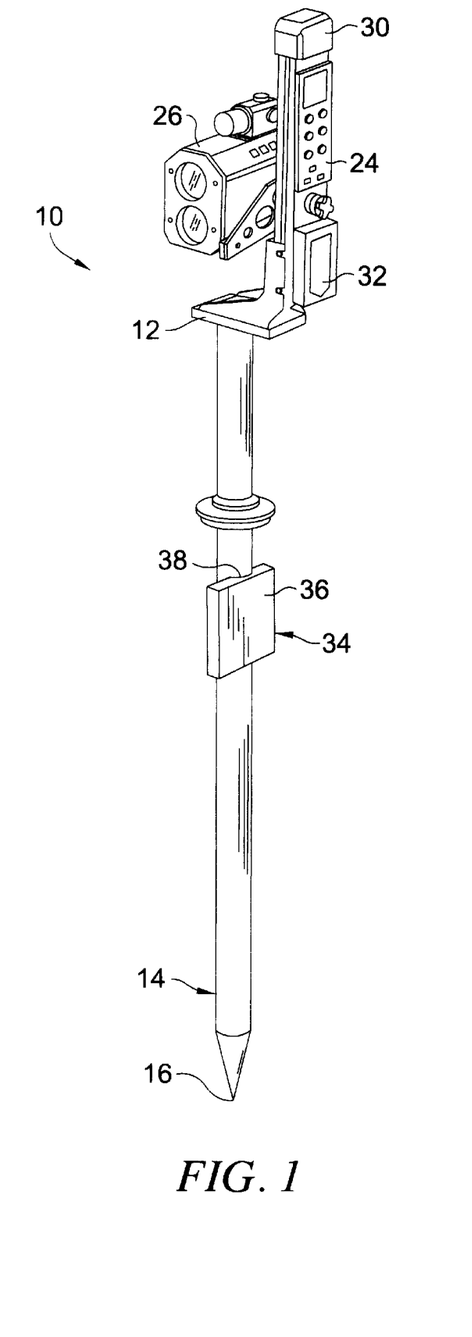
FIG. 1 is a side perspective view of a modular laser based survey instrument mounted on a monopod with a tilt alarm module in accordance with a first embodiment of the invention fastened to the monopod.

Referring now to the drawing, FIG. 1 shows a first embodiment of a monopod supported modular range finding instrument 10 in accordance with the invention. The instrument 10 is fastened to a mounting platform 12 at the upper end of a monopod 14 which has a point 16 at its lower end. This point 16 is designed to be placed exactly on the reference point on the earth from which the measurement is to be taken with the monopod 14 held substantially vertically aligned above this point. The monopod 14 arrangement in FIG. 1 with a pointed tip 16 is particularly designed for use with a ring core fluxgate compass sensor.

The instrument 10 in this embodiment, as shown, may be any range finding instrument and is preferably a modular laser range finding system as is disclosed in copending U.S. patent application Ser. No. 08/918,395, filed Aug. 26, 1997 and entitled MODULARIZED LASER BASED SURVEY SYSTEM, the disclosure of which is hereby incorporated by reference in its entirety.

Figure 5:
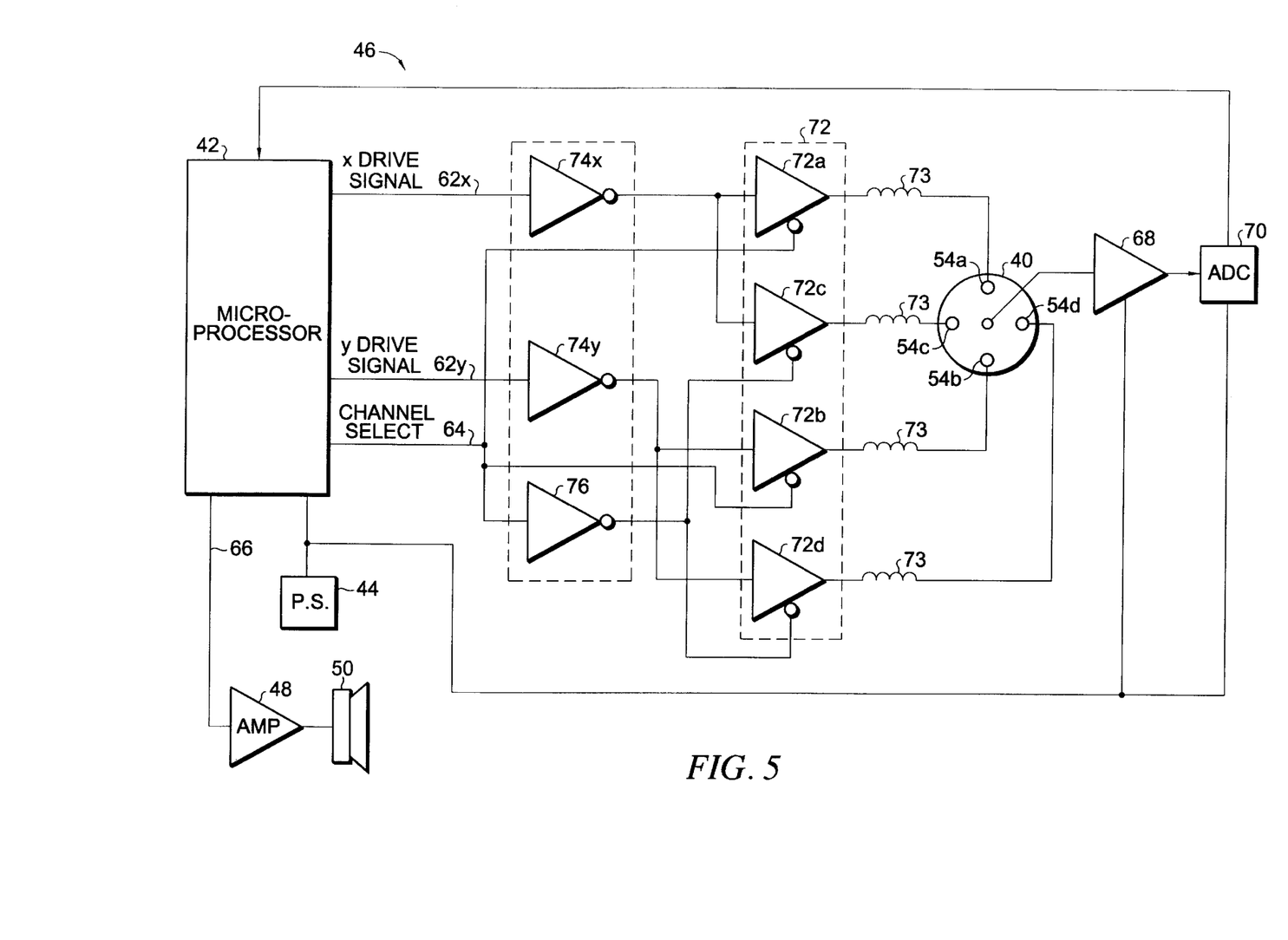
FIG. 5 is a preferred drive circuit for operating the electrolytic two axis tilt sensor shown FIG. 4 in accordance with an aspect of the present invention.

The instrument 10 includes a power supply 32, a compass module 24 and a laser range finder module 26 attached to the compass module 24. The compass module 24 preferably includes a ring core flux gate compass sensor located in a box 30 at the top of the module 24. A removable, stand alone tilt alarm module 34 is preferably removably fastened to the shaft of the monopod 14 via a conventional means such as hook and loop fastener strips, bolts, screws, clamps, etc. The module 34 has a housing 36 which includes a "V" or "U" shaped vertical groove 38 in the surface of the housing 36 for receipt and alignment with the monopod shaft 14 so that the housing 36 is oriented in accurate parallel alignment with the axis of the monopod 14. The housing 36 carries a two axis electrolytic tilt sensor 40 therein along an alarm circuit which may be analog or digital. The housing 36 preferably holds the two axis tilt sensor 40 in alignment with the groove 38, and further houses a microprocessor 42, a power supply (batteries) 44, a tilt sensor driver circuit 46, an audio amplifier 48 and a speaker 50 as is shown in FIG. 5. The module 34 may include a display such as an LCD readout and one or more input buttons (not shown) for calibration and setup purposes.

Figure 2:
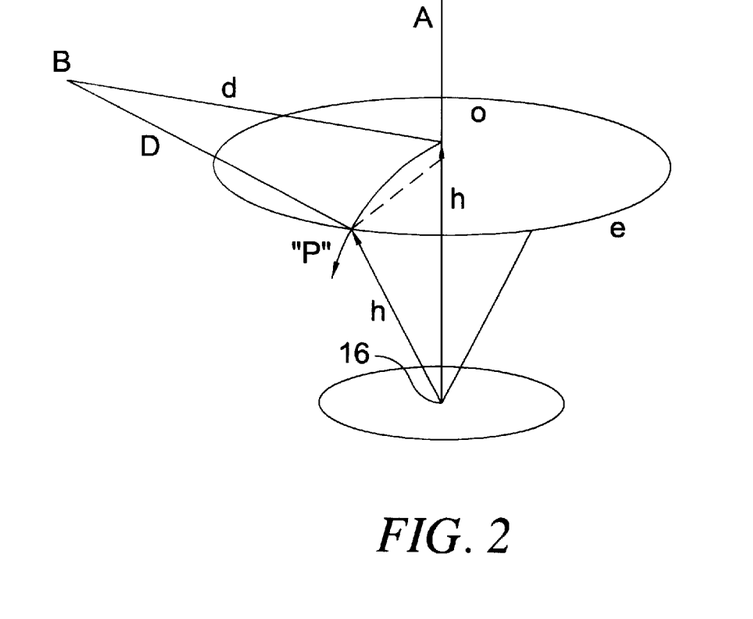
FIG. 2 is a vector representation of a monopod supported instrument in an off vertical orientation taking a distance measurement to a target B.
Figure 3:
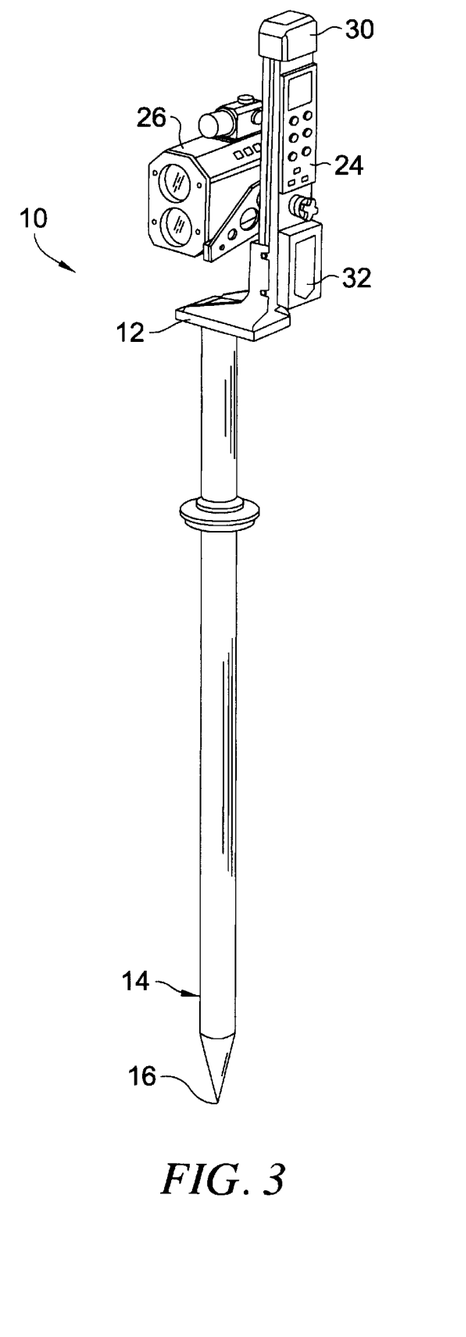
FIG. 3 is a perspective view of a modularized laser based surveying instrument in accordance with a second embodiment of the invention.

FIG. 2 is a diagram of a monopod mounted instrument 10 on a monopod 14 as shown in FIGS. 1 and 3 that is free to rotate about the point 16 such that the instrument 10 may be tilted from the vertical axis "A". This results in the instrument 10 being positionable anywhere on a hemispherical surface having a radius "h". When the instrument 10 is positioned off of the vertical axis and a measurement is taken, the instrument, and hence the compass sensor, is essentially tilted or rotated about its own axis toward the target. When the instrument 10 is positioned vertically, a distance measured from "O" will be accurately related directly to the ground point 16. However, any distance measurement "D" to a distant object "B" which is made from a position "P" will be incorrect with reference to the ground point 16, since the reference plane through "O" is no longer the horizontal base plane for the measurement. Further, the compass bearing will be incorrect. A plane through the point "P" and normal to the surface of a sphere having radius "h" (the length of the monopod 14) is now the base plane for the measurement.

The true distance "d" between O and B and the correct compass bearing may be mathematically determined if the angle (direction) and magnitude of tilt to the point P is known. The two axis tilt sensor 40 senses this angle and magnitude. In most survey applications, the errors introduced are very low provided that the instrument 10 is maintained within about 3 degrees of vertical. Consequently, in this first embodiment of the present invention, the tilt sensor 40 is used to merely warn the operator when the instrument is approaching or is beyond the acceptable limit for accuracy of the measurements being made.

Figure 4:
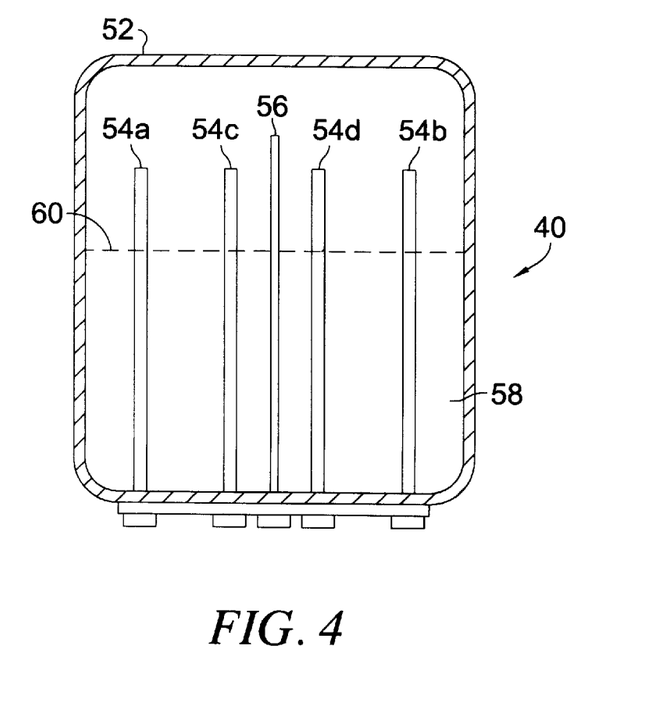
FIG. 4 is a side view of a conventional electrolytic two axis tilt sensor utilized in the embodiments of the present invention.

FIG. 4 shows a two axis tilt sensor 40 separate from the tilt sensor module 34. The sensor 40 may be one of any of a number of commercially available two axis tilt sensors and is preferably a two axis electrolytic tilt sensor such as an LCL series sensor which has nonmagnetic titanium leads. This LCL tilt sensor, series 0717-4400, is manufactured by The Fredricks Company, 2400 Philmont Avenue, Huntingdon Valley, Pa. 19006.

The sensor 40 preferably has titanium nonmagnetic leads so that it may be mounted right next to the actual compass sensor in the compass sensor module 30 on top of the compass module 24 in the monopod supported instrument 10 as is shown in FIG. 2 rather than in a separate, stand alone configuration as shown in FIG. 1.

The electrolytic tilt sensor 40 basically is a closed glass, liquid containing envelope 52 with four parallel peripheral electrodes 54a, 54b, 54c, and 54d spaced 90° apart around a central electrode 56 extending into the interior volume of the envelope 52. A conductive fluid 58 partially fills the sensor envelope 52. The fluid surface 60 is essentially a plane that always remains normal to the direction of the gravitational force acting on the fluid 58 in the cell 40. Consequently, when the monopod 14 is vertical and held stationary, the surface 60 of fluid in the sensor 40 will be stationary, level and horizontal and is at the same depth, i.e., point on each of the electrodes 54 in the cell 40. Stated another way, the depth of fluid 58 around each electrode 54 is the same when the cell 40 is vertically oriented.

The electrolytic tilt sensor 40 operates by sensing changes in the conductance between each of the four peripheral electrodes 54 and the central output electrode 56. These sensors preferably have to be driven with AC signals and without any DC bias because a DC bias would degrade the fluid 58 by electrolysis.

FIG. 5 shows a simple drive circuit 46 in accordance with the invention for driving the sensor 40. The circuit 46 comprises the microprocessor 42 which provides a drive signal to the tilt sensor 40 on lines 62x and 62y, a channel select signal to the tilt sensor 40 on line 64, and an output signal on line 66 from the microprocessor 42 to the audio amplifier 48 and the speaker 50. The power supply 44 consists of a pair of "AA" batteries, and provides power to the microprocessor 42, the amplifier 48, and the buffers of the drive circuit 46 which will be described shortly. The output of the tilt sensor 40 from terminal electrode 56 is connected through a buffer 68 to an analog to digital converter 70 and then to the microprocessor 42 for processing and eventual output to the speaker 50 via line 66 if the magnitude of the tilt angle exceeds a predetermined threshold value stored in the microprocessor 42.

The electrode pins 54a and 54b constitute the "x" pair and electrode pins 54c and 54d constitute the "y" pair of electrodes for the two axis sensor 40, since these pairs of opposing electrodes are orthogonal to each other. The electrode pins 54a, 54b, 54c, and 54d are each connected to the output terminal of one of four tristate buffer 72a, 72b, 72c, or 72d through an rf suppression coil 73.

The microprocessor 42 provides two drive output signals, one on line 62x and one on line 62y, for the electrolytic sensor 40. Each of these drive signals is exactly a 50% mark space ratio square wave. The drive output on line 62x is connected to buffers 72a and 72c through an inverter 74x. The drive output signal on line 62y is connected to tristate buffers 72b and 72d through an inverter 74y.

A channel select signal from the microprocessor 42 on line 64 is connected to the gates of each of the tristate buffers 72a,b,c,d. The channel select signal on line 64 is directly connected to the buffers 72a and 72b and connected through an inverter 76 to buffers 72c and 72d. This arrangement ensures that the idle pair of peripheral electrodes is floated. The channel select signal on line 64 effectively switches between the orthogonal pairs of electrodes and is synchronized to the channel being driven, either the x channel or the y channel, so that changes in the channel select between 0 volts and 5 volts occur during a period when both electrodes in the operating pair are at 0 volts. This design provides a zero bias on the idle pair of electrodes in order to minimize electrolysis in the electrolyte and to minimize crossover interference between channels. Stated another way, the exactly synchronized channel select signal on line 64 is synchronized so that the drive signals are appropriately fed to the appropriate pairs of opposing electrodes such that the nondriven electrodes are floating while the driven electrode provides an output. This ensures that the x and y components of the tilt angle are accurately sensed without interference from the other component and minimizes the potential for degradation of the electrolyte in the cell.

Figure 6:
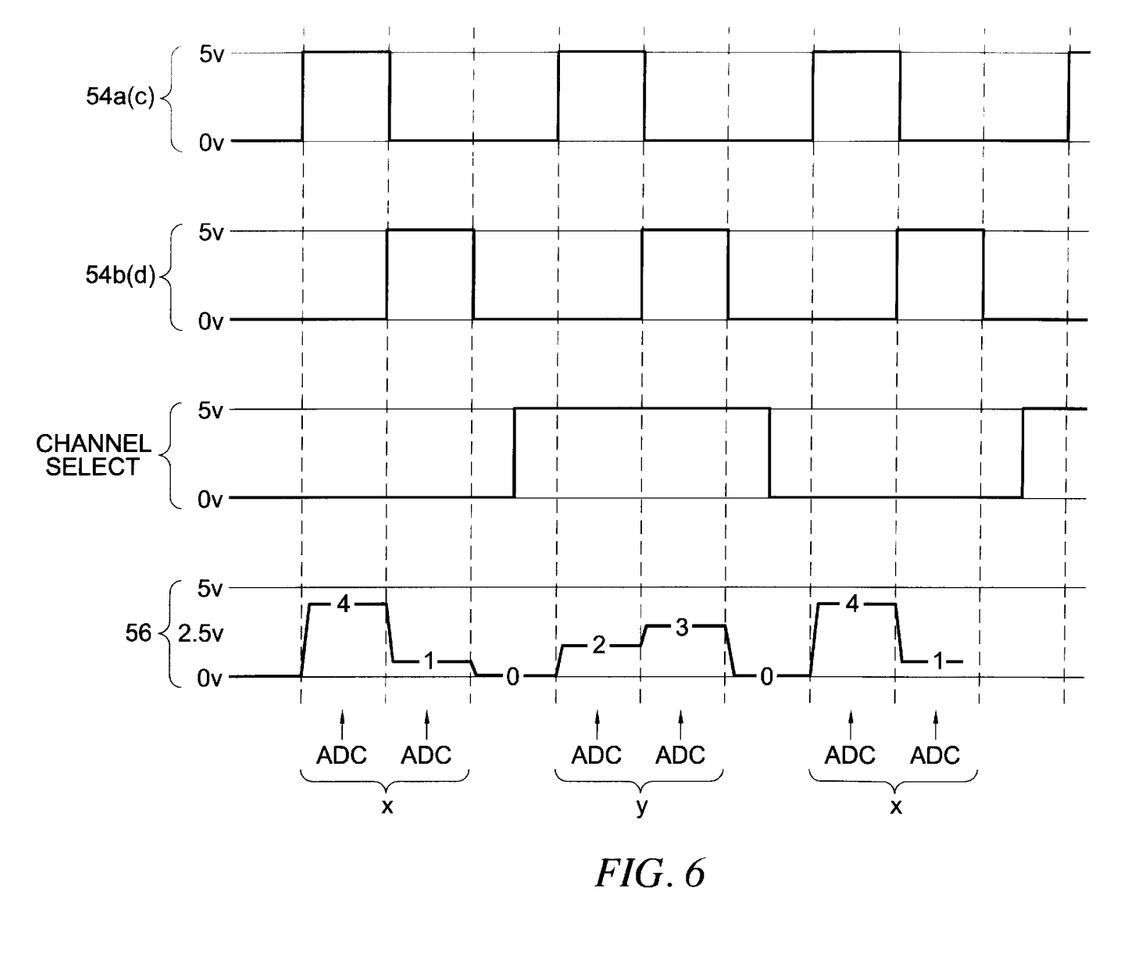
FIG. 6 is a graphical representation of the drive voltage and output signals of the tilt sensor shown in FIG. 4 utilizing the circuit shown in FIG. 5.

The waveforms seen by the electrode pairs 54a,b and 54c,d are shown in the upper two portions of FIG. 6. The channel select signal is shown in the third portion while the output voltage as seen on electrode 56 is shown in the lowest portion of FIG. 6. Since the drive signal waveforms pass through inverters 74x,y, the square wave sequences illustrated are inverted from those generated by the microprocessor 42.

There are several ways to operate the circuit shown in FIG. 6. The following is merely one exemplary operational description in which each pair of electrodes is driven in alternating sequence. When an opposing pair of electrodes 54a and 54b, shown in FIG. 4, which are diametrically opposite the central electrode 56, is preferably driven with a waveform as shown in the upper portion of FIG. 6, and the voltage on the central electrode 56 is monitored with the sensor 40 tilted off level, the voltage on the central output electrode 56 may be as shown in the lowest portion of FIG. 6.

Each drive pulse period, for ease of explanation, is broken into three preferably equal time segments as shown by the vertical dashed lines in FIG. 6. The channel select line 64 may initially be held to zero volts as shown for driving the x channel electrodes 54a and 54b as illustrated. This enables the tristate buffers 72a and 72b and disables buffers 72c and 72d, thus providing a high impedance on electrodes 54c and 54d.

At the beginning of the first segment, a low drive pulse is produced on line 62x by the microprocessor 42. This low voltage is inverted by inverter 74x to a positive going pulse which is fed through enabled tristate buffer 72a to the electrode 54a as shown in the top waveform of FIG. 6. During this same time, the drive signal on line 62y is maintained high and therefore the inverted output of inverter 74y is low, e.g. zero volts. Therefore electrode 54b sees zero volts. The other two electrodes 54c,d are disabled and floated via the high impedance state provided by the tristate buffers 72c,d. The resultant voltage output on electrode 56 is shown as reaching +4 volts in the lowest waveform of FIG. 6.

During the second segment, when the drive pulse to electrode 54a terminates, the drive signal out of the inverter 74y goes high, to 5 volts, thus causing electrode 54b to have a potential of 5 volts and electrode 54a drops to zero volts. During this segment the output voltage on electrode 56 drops to +1 volt. At the end of the second segment, the drive pulse on electrode 54b drops to zero volts. During the third segment, when both of the drive signals are zero volts, the channel select signal may be synchronized to change to 5 volts, as shown, thus selecting tristate buffers 72c,d and disabling and floating buffers 72a,b.

The pulse sequence above described then repeats, except that now electrodes 54c and 54d are sequentially driven during the first and second segments. Specifically, at the beginning of the first segment, a low drive pulse is produced on line 62x by the microprocessor 42. This low voltage is inverted by inverter 74x to a positive going pulse which is fed through enabled tristate buffer 72c to the electrode 54c as shown in the top waveform of FIG. 6. During this same time, the drive signal on line 62y is maintained high and therefore the inverted output of inverter 74y is low, e.g. zero volts. Therefore electrode 54d sees zero volts. The other two electrodes 54a,b are disabled and floated via the high impedance state provided by the tristate buffers 72a,b. The output voltage on electrode 56 during this segment is +2 volts.

During the second segment, when the drive pulse to electrode 54c terminates, the drive signal out of the inverter 74y goes high, to 5 volts, thus causing electrode 54d to have a potential of 5 volts and electrode 54c drops to zero volts. The output voltage on electrode 56 now changes to +3 volts. At the end of the second segment, the drive pulse on electrode 54d drops to zero volts. During the third segment, when both of the drive signals are zero volts, the channel select signal may change again back to 0 volts, thus selecting tristate buffers 72a,b and disabling and floating buffers 72c,d.

Alternatively, the sequencing of the channel select signal on line 64 may be set to provide a series of consecutive x component sample values followed by a series of consecutive y component sample values rather than alternating between them. The series sequencing may be advantageous in providing an average set of x and y component values in field situations to improve resolution. For example, the channel select signal may be programmed to change every $10^{th}$ cycle to provide a more stable tilt value based on time averages of the signals.

As shown in the bottom waveform of FIG. 6, the output voltage on electrode 56 lags the rise and fall of the peripheral electrode voltages. Therefore the ADC 70, as indicated by the arrows, is programmed to sample the output waveform of electrode 56 after it has had an opportunity to stabilize during each of the segments.

The two detected or sampled values of voltage on the output electrode 56 sampled during the first and second segments for electrodes 54a,b are algebraicly subtracted in order to obtain the magnitude of tilt in the x direction. Similarly, the two detected or sampled values of voltage on the output electrode 56 during the first and second segments for electrodes 54c,d are algebraicly subtracted to provide the magnitude of tilt in the y direction. Thus the x value of tilt in the example illustrated in FIG. 6 is +4−(+1)=+3 and the y value of tilt in the example illustrated is +2−(+3)=−1. The microprocessor 42 then preferably calculates the resultant vector magnitude and compares the result to a previously stored threshold value to determine whether an audible alarm is to be produced via amplifier 48 and speaker 50 via output line 66. Alternatively, the microprocessor 42 may be programmed to directly compare the component values to previously stored component threshold values to determine whether an audible alarm is to be produced via output line 66 to amplifier 48 and speaker 50.

If the tilt sensor is positioned level, the output on electrode 56 would be a constant +2.5 volts. As the sensor 40 is tilted from the level condition, the output voltage deviation with respect to the 2.5 volt level is symmetrical for each of the pair of excited electrodes. Thus measuring the voltage produced by exciting each electrode in the pair separately and then subtracting the two effectively doubles the sensitivity that a measurement made with only one electrode excitation provides.

One advantage of this essentially digital circuit described above over conventional two axis tilt sensor signal processing circuits is that the microprocessor 42 itself can provide a precise 50% square wave drive signal so the x and y elements in the cell 40 to generate anti-phase signals on the central electrode 56, thus minimizing the number of components required in the circuitry.

The drive circuitry above described is simple and efficient. To summarize, the magnitude of the voltage difference is proportional to the degree of tilt in the x or y components of the tilt vector. The sign of the difference is proportional to the direction of the x or y component of the tilt vector. The sensor is normally mounted so that when the instrument 10 is level there is a zero signal (in the exemplary embodiment this is 2.5 volts). Tilt one way you'll get a positive difference, tilt the other way you'll get a negative difference. The tilt warning device 34 of this first embodiment may thus be affixed to any survey instrument or mount for the instrument, provided the sensor 40 is oriented vertically with reference to the instrument itself This is conveniently facilitated in the monopod arrangement illustrated in FIG. 1 by the groove 38 provided in the housing 36 in this embodiment.

Further, this first embodiment may be implemented in a simplified form utilizing analog circuitry rather than the digital circuitry as described in detail above. In an equivalent analog circuit, the microprocessor would be replaced by analog components and circuitry that generates the drive waveforms, performs the subtractions and comparisons described above to detect the degree of tilt and provides an alarm output tone that either changes pitch or intensity as the support and attached sensor deviates further from the level position. The threshold may preferably be preset in the simplified version. For example, the threshold may be set to begin issuing a tone at a deviation of 3 to 5 degrees from vertical. The threshold circuit could also include another step such as to change the alarm tone to an intermittent tone at the limits of a compass module such as about 15 degrees. This would alert the operator when off vertical conditions are tolerable and also when the monopod is tilted to an unacceptable tilt value.

Second Embodiment

A second preferred embodiment of the invention is shown in FIG. 3. In this embodiment, the components of the tilt alarm apparatus are mounted within the compass module 24 and the tilt sensor 40 itself is housed within the compass sensor module 30. In this second embodiment, the main instrument power supply 32 replaces the battery power supply 44, an extra channel of the compass module microprocessor is used instead of the microprocessor 42, and an ADC that is already in the compass module 24 which is used to digitize the electronic compass sensor output is used in place of the ADC 70 shown in FIG. 5 for the first embodiment. The output signal from buffer 68 is simply fed to an extra input channel on the analog to digital converter. Its output is in turn fed back to appropriate logic in the microprocessor in the compass module 24. Lastly, the audio amp 48 and speaker 50 and the remainder of the circuit 46 remain as above described and simply mounted in the compass sensor module 30. This second configuration maximizes utilization of available circuitry and components, while the first embodiment above described may be utilized with any conventional survey instrument.

Figure 8:
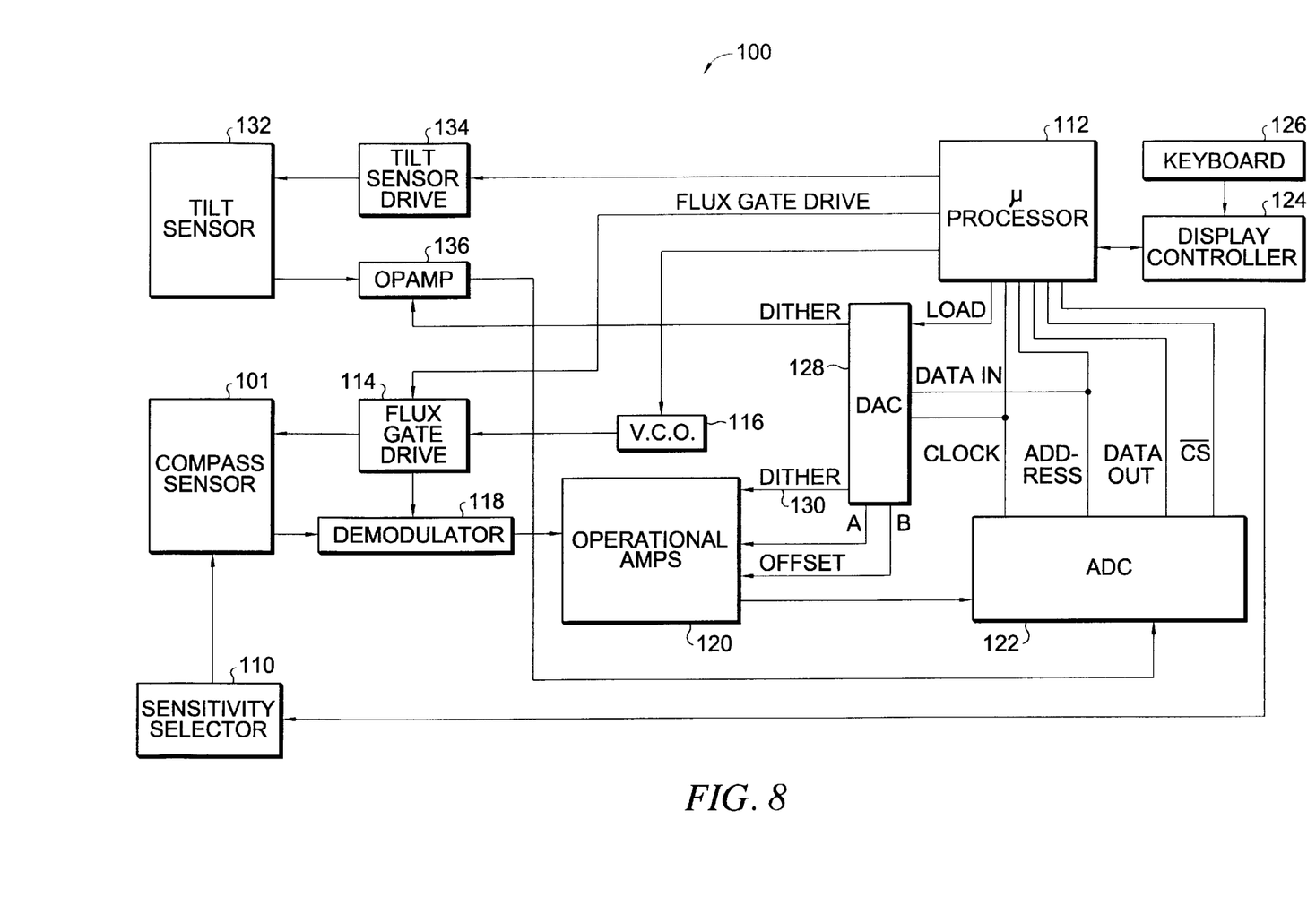
FIG. 8 is a block diagram of the fluxgate compass and tilt compensation module of the instrument shown in FIG. 3.

A block diagram of the compass and tilt sensor circuitry for the second embodiment shown in FIG. 3 is shown in FIG. 8. Circuit 100 is a basic drive and sensing circuit for a fluxgate compass sensor 101 and the tilt sensor 40. Circuit 100 also includes a microprocessor 112, a tilt sensor drive circuit 134 as described above with reference to FIG. 5, a display controller 124, a keypad 126, an analog to digital converter 122 and a digital to analog converter 128. The circuit 100 intermittently drives the fluxgate compass sensor core and senses and demodulates the composite compass sensor output signal in a demodulator 118. The demodulator 118 and operational amplifiers 120 together generates an x component and a y component of the sensed external magnetic field which can then be used to calculate the heading of the field or the direction of the field, relative field strength, and other such information.

Fluxgate compasses work exceedingly well when the location on the earth's surface is below the Arctic Circle or north of Tierra Del Fuego. Outside these latitudes, i.e., close to one of the poles, the horizontal component of the magnetic bearing signal is quite weak compared to the z component. Consequently, the achievable accuracy may be compromised. Thus the circuit 100 also includes an automatic dual range sensitivity circuit 110 which is controlled by the central microprocessor 112 which automatically increases coupled component sensitivity in order to compensate for decreased magnetic field strength when the compass is being utilized in latitudes near either of the earth's magnetic poles.

The fluxgate compass sensor 101 is driven by a flux gate drive circuit 114 which provides a precise 50% duty cycle square wave at an operating frequency optimized for the particular fluxgate sensor 101. In the preferred embodiments shown, this frequency is preferably a precise 22.5 kHz signal generated in the fluxgate drive circuit 114 which has, as one input, a voltage controlled oscillator 116, which is in turn controlled by the microprocessor 112. The fluxgate drive circuit 114 also provides an exact double frequency, 45 kHz square wave signal to a demodulator circuit 118. The output of the compass x and y coils is fed also to the demodulator circuit 118 which demodulates, i.e., removes the coupled drive coil signal component from the output signal for each of the x and y components. The demodulated x and y component signals are then differentially amplified in operational amplifiers 120 and then sent to an analog to digital converter (ADC) 122. The ADC 122 then sends the digitized x and y components of the bearing signal to the microprocessor 112 for calculation of the bearing or direction. The resultant bearing is then displayed via display controller 124.

An input keypad 126 on the face of the compass module 24 is used to provide manual input to the microprocessor 112 such as operational mode selections and calibration mode values and other information required for calibration of the instrument.

DAC 128 provides a dithering signal 130 to the operational amplifiers 120 to provide increased accuracy between the digital steps typically generated by the ADC 122. This dithering signal is also provided to the operational amplifier 136 which is equivalent to the buffer 68 in the first embodiment. The operational amplifier 136 output is fed to ADC 122 which in turn converts the analog tilt sensor 132 output into digital values of the x and y components of tilt which is then sent to the microprocessor 112. As with the compass signals, the dithering signal 130 provides small changes to the baseline output voltage signals which, over time, provides increased accuracy between the digitized output steps otherwise provided by the DAC 128.

The two axis tilt sensor 40 is driven by a tilt sensor drive circuit 134 controlled and timed by the microprocessor 112 as above described with reference to the first embodiment. Thus the waveforms and output operational descriptions provided with reference to FIG. 6 apply equally well to this second embodiment. The sensor 40 through the microprocessor 112 preferably also provides a warble tone via a speaker 50 (not shown in FIG. 8) mounted in the compass module 24 which is audible to the user and which indicates a progressive warning to the user as the platform of the instrument shifts off of a horizontal plane beyond a preset amount.

Third Embodiment

Figure 7:
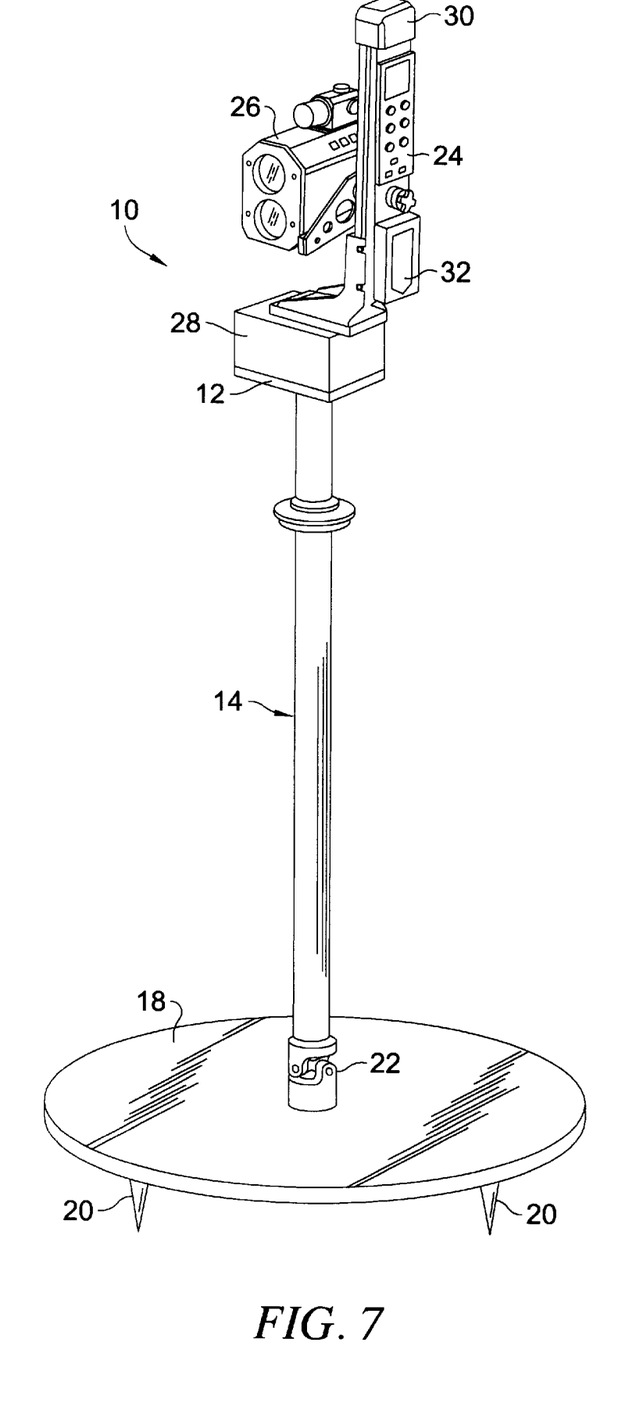
FIG. 7 is a side perspective view of another modular laser based survey instrument on an alternative monopod support which utilizes a universal joint to maintain constant azimuth relationship to the measuring instrument while permitting inclination of the support off of vertical, particularly for use with an angle encoder module in accordance with a third embodiment of the invention.

FIG. 7 shows a third embodiment of the instrument 10 on an alternative monopod 14 support which has a plate 18 at the bottom in place of the point 16. This plate 18 has teeth 20 on the bottom to engage the ground and keep the plate 18 from sliding or rotating from the reference placement. The plate 18 is fastened to the lower end of the monopod 14 shaft via a universal joint 22. The universal joint 22 permits the shaft of the monopod 14 to be inclined from vertical but prevents rotation or twisting of the platform 12 about the monopod axis. In other words, the joint 22 prevents changing the azimuthal orientation of the mounting platform 12.

The alternative arrangement of the monopod 14 shown in FIG. 7 with a base plate 18 and universal joint 22 must be used when an angle encoder module 28 is interposed between the mounting platform 12 and the compass module 24. This is necessary since, when an angle encoder 28 is used, there must be a stable reference angular position for the angle encoder to sense deviation from, i.e. the monopod 14 cannot twist, hence the plate 18 and universal joint 22 are necessary.

The instrument 10 in this third embodiment is the same as in the second embodiment and includes the circuit 100 as above described with reference to the second embodiment. The instrument 10 includes a laser range finder module 26 and compass module 24 mounted on top of an angle encoder 28 which is in turn mounted on the platform 12. The compass module 24 also includes a fluxgate compass sensor module 30 mounted on top so as to be displaced from the instrument power supply module 32. The compass module 24 houses a microprocessor 112 to which the ring core compass sensor 101 located in the compass sensor module 30 and/or angle encoder 28 is connected, and supports an input keypad and an LCD readout as shown.

As just mentioned, the compass sensor module 30 may or may not house a fluxgate compass sensor 101. In either case, the module 30 includes a tilt sensor 40 as in the second embodiment. The angle encoder 28 in this embodiment is connected directly to the microprocessor 112. The tilt sensor 40, tilt sensor drive 134, tilt output operational amplifier 136, DAC 128 and ADC 122 remain connected as shown in FIG. 8 and operate as described above.

Referring now to back to FIG. 2, it may be recalled that this figure illustrates the errors that may be introduced by having a tilted support for the measuring instrument 10. Assume the vertical height h of the laser range finder 26 is known and the point 16 of the monopod support 14 is placed at the reference or control point on the ground. If the instrument 10 were perfectly vertically aligned along axis A, then no errors are introduced. However, if the monopod 14 is inclined to the position as indicated by the arrow "h", then the actual vertical height above ground is actually less than the height h and the laser range finder 26 is somewhere on the circle "e" which is laterally displaced from the axis A. The position of point "P" relative to axis A is represented by the tilt sensor vector. The two axis tilt sensor 40 determines the x and y coordinates of this tilt vector and mathematically the microprocessor 112 can accurately determine the magnitude of offset distance and the angular location of the range finder 26 on the circle e relative to the compass zero or true North. This information may then be used by the microprocessor 112 to compensate for magnitude and direction of the offset to correct for off vertical mounting of the laser range finder 26.

The microprocessor 112 in both the second and third embodiments shown in FIGS. 3 and 7 may be programmed to automatically correct for the effects of measurements made with these tilted monopod configurations. Thus the microprocessor 112 can tilt correct azimuth errors when the instrument is off horizontal. In addition, a primary function of the invention in these embodiments is to automatically correct the vertical angle measurement made by the internal tilt sensor in the laser distance module 26. In this situation, the audible alarm feature described above may be eliminated or alternatively provided only when the instrument is tilted beyond the functional capabilities of the fluxgate compass (if used).

Since the x and y coordinates of the tilt vector are known from the tilt sensor 40 via the operational amplifier 136 and ADC 122, and the length of the monopod 14 is known, the microprocessor 112 can simply utilize matrix transformation algorithms to transform measured distance and bearing to target to actual bearing, elevation and range to target information to the horizontal planar coordinate system. Such an automatic compensation scheme thus frees the operator from the necessity of having to laboriously mount the base of the survey instrument on a horizontal plane and maintain alignment plumb with the control point on the earth in order to achieve extremely high accuracy results.

For example, the second embodiment shown in FIG. 3 may include a software routine in the microprocessor 112 which makes the appropriate corrections. Referring now to FIG. 2, the instrument 10 may be positioned with the point 16 as shown and the rangefinder 26 positioned at point "P". In this position, the rangefinder 26 is no longer upright. The rangefinder 26 is equivalently being rotated about its sighting axis to the target "B". Thus if the normal x, y, z coordinate system is used for a monopod 14 with a height "h", the following relationships apply. If the monopod is held vertically above the ground reference point shown in FIG. 2 as axis "A", the coordinates of the instrument 26 with respect to the ground are x=0, y=0, and z=h. However, when the monopod is tilted at an angle $\phi$ to the z axis and at an angle $\theta$ to the x axis, then the coordinates of the instrument with respect to the ground reference point are given by the following relationships.

$x = h^* \sin(\phi)^* \cos(\theta)$ $y = h^* \sin(\phi)^* \sin(\theta)$ $z = h^* \cos(\phi)$ The real target bearing angle, the true distance to target from the control point and the actual or real elevation to target are determined via software through this and similar geometric relations determined from the measured values of bearing, tilt angle, distance, and target elevation since the length h of the instrument 10 from the control point at the tip 16 is known.

The laser rangefinder also contains an internal tilt sensor for measuring the vertical inclination angle to the target. The measured vertical inclination angle will depend on the orientation of the instrument. For example, if the instrument is turned or rotated about its own axis as indicated in the FIG. 2, i.e., rotated about the sighting axis, by an angle ρ from an upright orientation, the measured angle of inclination to the target "B" is φ, then the true or actual vertical inclination angle θ is given by the following relationship.

$$\theta = \text{Tan}^{-1}(\tan(\phi) * \cos(\rho))$$

The above relationship is exact if the inclination tilt sensor acts as a pendulum within the rangefinder housing. For other internal tilt sensor geometries, additional corrections may be applied.

The correction angles and equations are different for the third embodiment shown in FIG. 7. This is because the instrument 10 utilizes an angle encoder in which the sensed angle is not dictated by the magnetic field effects on a horizontally oriented floating ring core sensor but is purely geometrically determined by the encoder rotational movement with respect to a zero orientation. If the plane of rotation of the angle encoder 28 is not in the horizontal reference plane then the measured horizontal angle to the target will differ from the actual horizontal angle target. For example, if the apparatus 10 shown in FIG. 7 was positioned as in FIG. 2, that is, with the rangefinder at point P and aimed at the target B, then the plane of the angle encoder will be tilted from the horizontal. As far as the angle encoder is concerned, this is equivalent to the plane of rotation of the encoder being tilted or rotated about the y axis by an angle φ). A typical conventional coordinate scheme is the y axis is directly ahead, the positive x axis extends to the right of the origin, and the z axis is vertically up. The measured "horizontal" angle i.e., angle with respect to the x axis, to a target B in the tilted plane is θ, then the true or actual horizontal angle ωto the target B in the real horizontal reference plane is given by the following relationship.

$$\omega = \text{Tan}-1(\text{Tan}(\theta)/\cos(\phi))$$

The correction of the laser tilt sensor reading as discussed above would also apply to the laser rangefinder 26 in the monopod configuration of FIG. 7.

The above corrections and matrices coordinate transformations to determine accurate measurements from the control point may be integrated into the microprocessor 112 so that the values of bearing and range read by the user are automatically corrected to the control point in all of the configurations shown and described. In addition, other corrections may be programmed into the microprocessor 112 such as corrections for inherent nonlinear characteristics of the tilt sensor 40, the internal inclination tilt sensor in the rangefinder 26, and the fluxgate compass sensor 101. These characteristic correction factors depend on the particular sensors utilized and therefore must be programmed into the microprocessor 112 on a case by case basis depending on the particular sensors being used.

While there have been described above the principles of the present invention in conjunction with specific embodiments, it is to be clearly understood that the foregoing description is made only by way of example and not as a limitation to the scope of the invention. As a case in point, the embodiments illustrated and described above all involve the use of a two axis tilt sensor 40 or 132. These sensing functions performed by the sensor may also be performed by two single axis tilt sensors or even one single axis tilt sensor that is mounted on the one dimensional support. In the latter case, the single sensor would be swivel mounted or ball bearing ring mounted to the support in such a way that it always rotates to and essentially hangs in the direction of tilt. Where two single axis tilt sensors are used, they would have to have their reference axes oriented parallel and oriented at right angles in the horizontal plane. Their outputs may be integrated into the drive circuit shown in FIG. 8. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A tilt sensor drive circuit for use with a tilt sensor arrangement having two pairs of opposing peripheral electrodes each pair spaced equally apart about a central signal output electrode to provide an output representative of tilt of said sensor arrangement from a horizontal orientation, said circuit comprising:

four tri-state buffers each having an output connected to one of said peripheral electrodes;

a drive signal generator producing a first and a second drive signal, said first drive signal being connected to an input terminal of one of said tristate buffers in each pair of opposing peripheral electrodes, said second drive signal being connected to an input terminal of another of said tristate buffers for the other electrode of each pair of said opposing peripheral electrodes; and a channel select signal generator producing a channel select signal connected to the gates of each of said tri-state buffers for one pair of opposing peripheral electrodes and connected through an inverter to the gates of each of said tri-state buffers for the other pair of said opposing electrodes.

2. The circuit according to claim 1 wherein said channel select and said drive signals are generated by a microprocessor.

3. The circuit according to claim 1 wherein each of said first and second drive signals is substantially a 50% mark space ratio square wave.

4. The circuit according to claim 3 wherein a change of said channel select signal is synchronized with said drive signals.

5. The circuit according to claim 4 wherein said channel select signal and said drive signals are derived from a microprocessor.

6. A tilt alarm apparatus for indicating when a member exceeds a predetermined tilt variance from a vertical orientation comprising:

a housing fastened to said member;

a power supply in said housing;

a two axis electrolytic tilt sensor mounted in said housing having a central output electrode and two pairs of opposing peripheral electrodes equally spaced about said central electrode; and a signal generator in said housing connected to said power supply and to said sensor, said generator producing drive signals and an alarm signal upon receipt of a tilt signal above a threshold;

a sensor drive circuit connected to said signal generator, said circuit selectively driving each of said pairs of peripheral electrodes to produce said tilt signal; and an alarm circuit connected to said generator producing an audible alarm upon receipt of said alarm signal.

7. The apparatus according to claim 6 wherein said signal generator produces a first and a second drive signal and a channel select signal.

8. The apparatus according to claim 6 wherein said alarm circuit produces an alarm sound through a speaker which varies in amplitude in proportion to the degree of tilt above a predetermined value.

9. The apparatus according to claim 6 wherein said alarm circuit produces an alarm sound through a speaker which varies in frequency in proportion to the degree of tilt signal from said tilt sensor above a predetermined value.

10. The apparatus according to claim 6 wherein said housing has an external linear channel in an outer surface of said housing for receiving and aligning said tilt sensor module with a portion of said member.

11. The apparatus according to claim 10 wherein said member is a support monopod having an elongated shaft.

12. The alarm according to claim 11 wherein a portion of said elongated shaft is received in said channel to align said tilt sensor with said monopod shaft.

13. A tilt alarm module adapted to be fastened to a monopod support for a distance measuring instrument in which the alarm module senses and indicates when the monopod support exceeds a predetermined inclination angle from a vertical orientation, said module comprising:

a housing fastened to said monopod support;

a power supply in said housing, a two axis electrolytic tilt sensor mounted in said housing having a central signal electrode aligned parallel to said monopod support and two pairs of opposing peripheral electrodes equally spaced about said central electrode;

a microprocessor in said housing connected to said power supply, said microprocessor producing a first and a second drive signal connected to said peripheral electrodes and producing a channel select signal for selecting between said opposing pairs of electrodes, said microprocessor further including a tilt input connected to said central signal output electrode and an alarm output providing an alarm signal when said tilt input from said tilt sensor exceeds a predetermined value.

14. The alarm according to claim 13 further comprising a sensor drive circuit receiving said drive signals and said channel select signal, said circuit selectively connecting said first and second drive signals to each of said pairs of peripheral electrodes while floating an idle pair of electrodes.

15. The alarm module according to claim 13 further comprising an analog to digital converter connected between said output electrode and said tilt input on said microprocessor for sampling said sensor output.

16. A laser based surveying instrument comprising:

a distance measuring modules a compass module; and a power supply module mounted on a monopod support, wherein said compass module includes a two axis electrolytic tilt sensor fastened to said compass module, said tilt sensor having a central signal electrode oriented parallel to an axis of said monopod support and two pairs of opposing peripheral electrodes equally spaced about said central electrode, said compass module including a drive circuit for said tilt sensor and an alarm circuit for providing an alarm when said monopod support is tilted beyond a predetermined threshold tilt value from vertical.

17. The instrument according to claim 16 wherein said compass module includes a microprocessor producing a first and second drive signal connected to opposing electrodes in each pair of said peripheral electrodes of said tilt sensor.

18. The instrument according to claim 17 wherein said microprocessor further generates a channel select signal operably connecting said drive signals to said pairs of opposing electrodes.

19. The instrument according to claim 18 wherein said microprocessor further provides an alarm signal to an audible alarm circuit when said tilt exceeds said predetermined threshold value.

20. The instrument according to claim 16 wherein said drive circuit includes four tri-state buffers each connected to one of said peripheral electrodes, said drive signal output being directly connected to an input terminal of said tri-state buffer for one electrode in each pair of peripheral electrodes and said drive signal being connected through a first inverter to an input terminal of said tri-state buffer for the other electrode of each pair of said opposing peripheral electrodes.

21. The instrument according to claim 20 wherein said channel select signal from said microprocessor is directly connected to a gate of each of said tri-state buffers for each one of a first of said pairs of electrodes and is connected through a second inverter to each of said tri-state buffers for each one of said second of said pairs of electrodes.

22. The instrument according to claim 16 wherein said alarm is audible when said inclination exceeds about 5 degrees inclination from vertical.

23. A method for alerting a surveying instrument operator to approaching unacceptable off vertical alignment conditions of the instrument when the instrument is mounted on a one dimensional support comprising the steps of:

a) providing a surveying instrument mounted on a one dimensional support;

b) providing a tilt sensor on the support capable of sensing a degree of tilt of the support from a vertical orientation;

c) sensing the degree of tilt; and d) communicating the degree of tilt to the operator.

24. The method according to claim 23 wherein said communicating step includes actuating an audible alarm when the degree of tilt exceeds a predetermined threshold value.

25. The method according to claim 24 wherein said communicating step include the step of varying the amplitude or frequency of the audible alarm as the degree of tilt passes beyond the threshold.

26. The method according to claim 23 further comprising the steps of determining a correction for measurements made in said off vertical alignment and automatically correcting said measurements for inaccuracies introduced by said off vertical alignment.

* * * * *